No. 626,877. Patented June 13, 1899.
H. C. SWAN.
CLAMP FOR VEHICLES.
(Application filed Oct. 31, 1898.)
(No Model.)
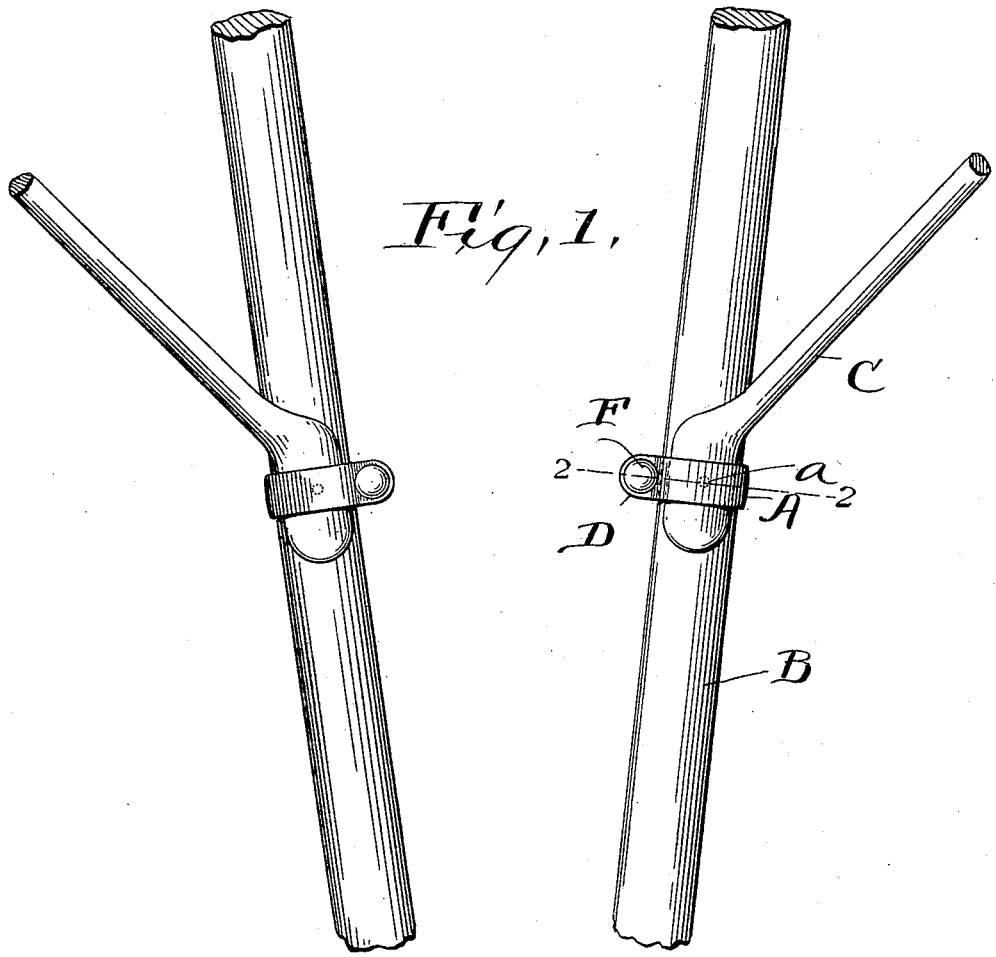
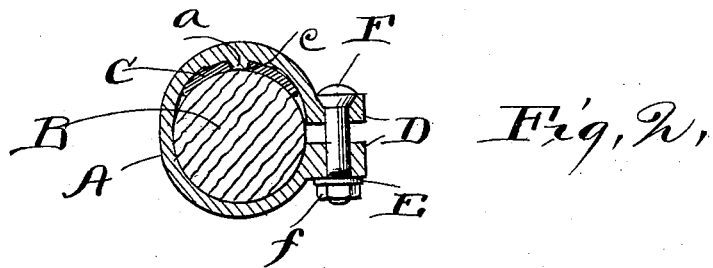
Witnesses,
E. B. Gilchrist
G. M. Wilkins
Inventor
Henry C. Swan
by A. M. Austin
his Attorney.
THE NORRIS PETERS CO., PHOTO-LITHO., WASHINGTON, D. C.

UNITED STATES PATENT OFFICE.

HENRY C. SWAN, OF OSHKOSH, WISCONSIN.

CLAMP FOR VEHICLES.

SPECIFICATION forming part of Letters Patent No. 626,877, dated June 13, 1899.

Application filed October 31, 1898. Serial No. 695,013. (No model.)

*To all whom it may concern:*

Be it known that I, HENRY C. SWAN, a citizen of the United States of America, residing at Oshkosh, Winnebago county, State of Wisconsin, have invented certain new and useful Improvements in Clamps for Vehicles, of which the following is a specification in such full, clear, and exact terms as to enable any person skilled in the art to which it appertains to make, construct, and use the same.

The annexed drawings and the following description set forth in detail one mechanical form embodying the invention, such detail construction being but one of various mechanical forms in which the principle of the invention may be used.

In said annexed drawings, Figure I represents a plan view of my improved clamp applied to a stay or brace; Fig. II, a detail sectional view on the line 2 2, Fig. I.

The object of my invention is to provide means for rigidly fastening perch-irons, stays, braces, and other metal parts of a vehicle to the wooden parts without perforating either the wooden or metal part and at the same time to provide a fastening that can be easily removed and replaced and that will have a neat and workmanlike appearance.

My invention consists in forming a clamp so that the parts to which it is attached will be secured together firmly and in such a manner that it will be impossible for said parts to work loose or change their proper relative positions.

The clip-yoke A is circular in outline and is adapted to embrace closely the perch B and brace C or the similar parts of a vehicle intended to be secured together. The clip-yoke is provided at one side with the lips D, that have a bore E formed therein. A bolt F engages said bore and is secured in place by a nut *f*. A small projection *a* is formed on the inner face of the clip-yoke and integral therewith. Said projection engages a corresponding recess *c*, formed in the brace C. After the perch and brace have been brought into their proper relative positions the clip is slipped over said parts and the projection seats in the recess. The nut is then tightened until the parts are bound rigidly and firmly together.

By the use of my improved clamp I avoid passing bolts, rivets, or similar fastening devices through the perch or wooden part of a vehicle, which greatly weakens said part and renders it less effective to endure strain. Heretofore various means have been employed to obtain this result, such as forming a clip-yoke integral with the perch-iron. An ordinary two-legged clip has also been used. Both of these constructions are objectionable, as they are clumsy in appearance and are too expensive to use in any but the best grade of vehicles. In my construction the clip-yoke embraces the entire circumference of the parts to be united, and thus affords a much more secure fastening than when the clamp and the parts to be secured come in contact merely at certain points, as with an ordinary clip. It will be observed that the projection is so arranged in relation to the lips of the clip-yoke that the bolt and nut are on the inside of the perch and only the outer face of the clip-yoke is visible from the side of the vehicle. This arrangement gives the vehicle a more finished appearance than is possible with any construction heretofore used. The projection on the inner face of the clip holds the brace or metal part in its proper position in relation to the perch or wooden part and prevents same from slipping or becoming misplaced. The clamp is likewise held in position and is prevented from slipping lengthwise of the parts. When an ordinary clamp is used, it requires to be tightened at intervals in order to hold the parts in place because of shrinkage; but by this construction the shrinkage is automatically provided for and the parts are held in place without further adjustment after the clamp has once been put in place. The position of the lug on the clip may be changed according to the location of the part to be secured, whether on the top or bottom of the rigid part. It is immaterial whether the lug is formed on the clip-yoke to engage a recess in the parts or whether it is provided on the metal part to engage a recess formed in the clip-yoke. In case a wooden part is to be secured to the metal part the recess may be formed in said wooden part, as it is not deep enough to weaken said part to any extent whatever.

What I claim is—

1. In combination with a rigid vehicle part and a metal brace provided with a recess to be secured thereto, a clip encircling said part and brace, said clip having an inwardly-extending projection engaging in said recess and being provided with perforated lips, and a bolt through said perforations adjustably securing said lips together, substantially as described.

2. In combination with a wooden vehicle-perch, and a metal brace provided with a recess to be secured thereto, a clip encircling said perch and brace, said clip having an inwardly-extending projection engaging said recess, and means for securing and adjusting the ends of the clip, substantially as described.

In testimony whereof I sign this application, in the presence of two witnesses, this 25th day of October, 1898.

HENRY C. SWAN.

Witnesses:
G. H. FOSTER,
G. M. WILKINS.